(12) United States Patent
Welnick et al.

(10) Patent No.: US 8,954,070 B2
(45) Date of Patent: Feb. 10, 2015

(54) METHOD AND SYSTEM FOR SELECTING A COMMUNICATION NETWORK

(75) Inventors: William E. Welnick, Poway, CA (US); William P. Alberth, Jr., Crystal Lake, IL (US); Murali Narasimha, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1352 days.

(21) Appl. No.: 11/610,661

(22) Filed: Dec. 14, 2006

(65) Prior Publication Data

US 2008/0146223 A1 Jun. 19, 2008

(51) Int. Cl.
*H04W 4/00* (2009.01)
*H04W 48/18* (2009.01)

(52) U.S. Cl.
CPC ..................................... *H04W 48/18* (2013.01)
USPC .................. 455/435.2; 455/432.1; 455/432.2; 455/432.3; 455/425; 455/423; 455/343.2; 455/343.5; 455/434; 370/241; 370/242; 370/252; 370/331; 370/329; 370/335; 370/341; 370/437; 713/168; 713/170; 713/176

(58) Field of Classification Search
USPC ................ 455/432.1, 432.2, 432.3, 425, 423, 455/343.2, 343.5, 434; 370/241, 242, 252, 370/331, 329, 335, 341, 437; 713/168, 170, 713/176
See application file for complete search history.

(56) References Cited

U.S. PATENT DOCUMENTS 5,734,980 A 3/1998 Hooper et al.
6,173,181 B1 * 1/2001 Losh .............................. 455/434

2002/0039892 A1 4/2002 Lindell
2002/0065067 A1 5/2002 Khare et al.
2003/0083064 A1 5/2003 Cooper
2004/0192304 A1 9/2004 Casaccia et al.

(Continued)

FOREIGN PATENT DOCUMENTS

DE 10308012 A1 9/2004
DE 102004035956 A1 7/2006

(Continued)

OTHER PUBLICATIONS

Nobuyuki Uchida; "GSM/UMTS PRL Overview"; XP002358636; Nov. 3, 2003; pp. 1-20.

(Continued)

*Primary Examiner* — Nimesh Patel
(74) *Attorney, Agent, or Firm* — Lerner, David, Littenberg, Krumholz & Mentlik, LLP

(57) ABSTRACT

A method and system for selecting a communication network by a wireless communication device (106) includes receiving (310) an identification parameter at the wireless communication device from a communication network which identifies the communication network. Next, the method compares (312) the identification parameter with a list at the wireless communication device to determine (314) service information. The service information identifies the services supported by the communication network. The method further includes comparing (316) the service information with a service-related datum at the wireless communication device that indicates the services desired by the wireless communication device. Lastly, the method includes selecting (318) the communication network for accessing a requested service if the service information matches the service-related datum.

18 Claims, 9 Drawing Sheets

(56) References Cited

U.S. PATENT DOCUMENTS

| | | | |
|---|---|---|---|
| 2004/0192328 A1* | 9/2004 | Giacalone et al. | 455/455 |
| 2004/0224684 A1 | 11/2004 | Dorsey et al. | |
| 2004/0235475 A1 | 11/2004 | Ishii | |
| 2005/0153691 A1* | 7/2005 | Xue et al. | 455/432.1 |
| 2005/0266844 A1 | 12/2005 | Narasimha | |

FOREIGN PATENT DOCUMENTS

| | | |
|---|---|---|
| EP | 1292169 A2 | 3/2003 |
| EP | 1569484 A1 | 8/2005 |
| WO | 2004043098 A1 | 5/2004 |

OTHER PUBLICATIONS

Andrew Hunter; "PRL Enhancements for International Roaming"; XP002358637; Feb. 2004; pp. 1-16.

CDMA Development Group; PRL Enhancements for International Roaming; Version 1.0; Apr. 1, 2004; CDG Document 86 Version 1.0.

Rotem Cooper; PRL Enhancements for International Roaming, Feb. 2004.

PRL Enhancement Workshop San Diego; PRL Enhancements Frequently Asked Questions; Feb. 2004.

Perry Laforge; Support for Preferred Roaming List Enhancements for International Roaming; CDG Resolution 2003.2; Dec. 8, 2003.

International Search Report for Application No. PCT/US2007/074911 dated Feb. 12, 2008.

* cited by examiner

| SYSTEM RECORD FIELD | LENGTH (BITS) |
|---|---|
| 810 — SYS_RECORD_LENGTH | 5 |
| 812 — SYS_RECORD_TYPE | 4 |
| 814 — PREF_NEG | 1 |
| 816 — GEO | 1 |
| 818 — PRI | 1 |
| 820 — ACQ_INDEX | 9 |
| 822 — TYPE-SPECIFIC SYSTEM ID RECORD | VARIABLE |
| 824 — ROAM_IND | 0 OR 8 |
| 826 — ASSOCIATION_INC | 1 |
| 828 — ASSOCIATION_TAG | 0 OR 8 |
| 830 — PN_ASSOCIATION | 0 OR 1 |
| 832 — DATA_ASSOCIATION | 0 OR 1 |
| 834 — TYPE-SPECIFIC SERVICE INFO | 8 |

| DETAIL_SERVICE_INFO | LENGTH (BITS) |
|---|---|
| 910 — SRV_INFO_LENGTH | 5 |
| 912 — SRV_INFO_TYPE | 8 |
| 914 — SRV_INFO_SUBTYPE | 4 |
| 916 — TYPE-SPECIFIC SERVICE INFO | VARIABLE |

| SRV_INFO_TYPE BIT DECODING (1003) | PARAMETER DESCRIPTION (1006) |
|---|---|
| '00000000' | ALL SERVICES |
| '00000001' | VOICE |
| '00000010' | DATA SERVICES |
| '00000100' | PTT |
| '00001000' | WLAN |
| 'XXXX0000' | RESERVED |

| DATA SERVICES SUB-TYPE BIT DECODING (1103) | PARAMETER DESCRIPTION (1106) |
|---|---|
| '0000' | SMS |
| '0001' | MMS |
| '0010' | VOIP |
| '0011' | 1X PACKET DATA |
| '0100' | BROWSER |
| '0101' | VIDEO |

| WLAN SERVICES SUB-TYPE BIT DECODING | PARAMETER DESCRIPTION |
|---|---|
| '0000' | WIRELESS LAN, NO HANDOFF |
| '0001' | WIRELESS LAN WITH HANDOFF |

*FIG. 12*

METHOD AND SYSTEM FOR SELECTING A COMMUNICATION NETWORK

The present invention generally relates to the field of wireless communication, and more particularly, to a method and system for selecting a communication network to provide services to a wireless communication device.

BACKGROUND

A communication network typically includes at least one base station and numerous wireless communication devices. The base station provides a wireless communication device with services necessary for communication and data transfer to other devices in the communication network. Services provided to the wireless communication device may include, but are not limited to, voice-based services, internet services, short messaging services, or multimedia messaging services. Typically, the wireless communication device first registers on a communication network available at a 'home' geographic location and operated by a service provider. Then, the service provider allows the wireless communication device to access a particular service through the communication network, if the device is registered for that service.

Wireless communication devices can move out of the coverage area of this home communication network and move to areas covered by other communication networks operated by other service providers. In such a case, a wireless communication device is said to be in a 'roaming' mode. The service provider operating in the home network enters into agreements with other service providers so that a wireless communication device can access one or more services from other networks while in roaming mode.

Many methods are known for selecting a "best suited" communication network for a wireless communication device when it is roaming. In one such method, called 'manual selection', a user of a wireless communication device selects a non-home communication network from a list of available communication networks. In another method, a user defines preferences for selecting from available networks. Examples of user preferences are number and type of services provided, service cost, power consumption, signal strength, etc. Based on the user preferences stored on the wireless communication device, it selects a non-home communication network.

The methods described above can lead to a non-home communication network receiving registration requests from wireless communication devices that subscribe to a particular service on their home network but do not have roaming agreements for that service. Overloading of the non-home communication network through excessive registration requests may lead to diminished quality of services provided by the communication network. Moreover, scanning for non-home communication networks that ultimately will not provide the requested services, adds to the battery usage and processing load of a wireless communication device.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments, and to explain various principles and advantages, all in accordance with the present invention.

FIG. 8 illustrates an extended Preferred Roaming List (PRL) system table entry, in accordance with various embodiments of the present invention;

FIG. 9 illustrates a service information table, in accordance with various embodiments of the present invention;

FIG. 10 illustrates a table depicting coded representations of major types of services provided by a referenced communication network;

FIG. 11 illustrates a table depicting coded representations of data service subtypes provided by a referenced communication network; and FIG. 12 illustrates a table depicting coded representations of wireless local area network (WLAN) service subtypes provided by a referenced communication network.

Figure 1:
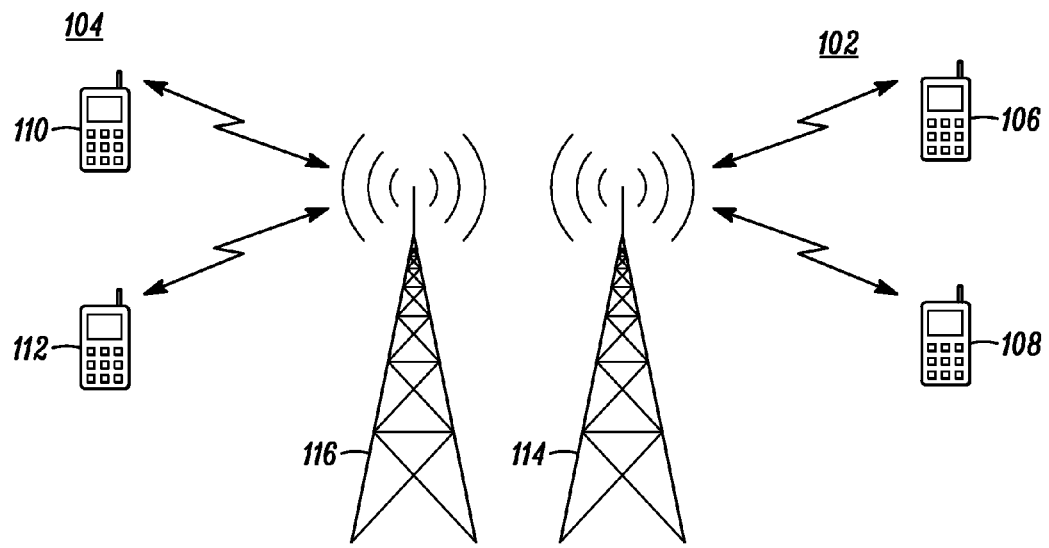
FIG. 1 illustrates a plurality of communication networks in which various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated relative to other elements, to help in improving an understanding of the embodiments of the present invention.

DETAILED DESCRIPTION

A method for selecting a communication network by a wireless communication device includes a wireless communication device receiving an identification parameter from a communication network. This identification parameter identifies the communication network. The device then compares the identification parameter with a list present at the wireless communication device and determines service information from the list. The service information identifies a service available from the communication network. Further, the method includes comparing the service information with a service-related datum available at the wireless communication device. The service-related datum indicates the service(s) the device seeks from a non-home communication network. Finally, the method includes selecting the communication network for accessing the sought-for service if the service information matches the service-related datum.

An embodiment of the method includes a wireless communication device receiving a system identification (SID) number and a network identification (NID) number from a communication network. The method compares the SID/NID with a list of SIDs/NIDs in an extended preferred roaming list (PRL) stored at the wireless communication device. If the SID/NID matches with an entry in the extended PRL, the method determines service information from the extended PRL. The extended PRL stores this information in a SRV_INF_TYPE field. Further, the method includes comparing data in the SRV_INFO_TYPE field with data in a SERVICES_ACTIVE field. The SERVICES_ACTIVE field, which indicates the services that the wireless communication device is requesting, can be present in the Number Assignment Module (NAM) at the wireless communication device. Finally, the method includes selecting the communication network if data in the SRV_INFO_TYPE field matches data in the SERVICES_ACTIVE field.

A wireless communication device includes a receiver capable of receiving a set of identification parameters from a communication network. The wireless communication device also includes a processor that is configured to compare the set of identification parameters with a PRL stored at the wireless device. If the set of identification parameters match at least one entry in the PRL, the processor determines service information from the PRL which identifies at least one service provided by the communication network. The processor is further configured to compare the service information with a service-related datum which indicates the service(s) that the wireless communication device is requesting. The processor is also capable of selecting the communication network if the service information matches the service-related datum.

FIG. 1 illustrates a plurality of communication networks in which various embodiments of the present invention can be practiced. FIG. 1 shows a first communication network 102 and a second communication network 104. The communication network 102 includes a first base station 114 and a plurality of wireless communication devices, such as a first wireless communication device 106 and a second wireless communication device 108. The wireless communication devices can share and exchange information or data through the first communication network 102. Examples of wireless communication devices include mobile phones, smart phones, Personal Digital Assistants (PDAs), laptop computers, pagers, etc. The first wireless communication device 106 and the second wireless communication device 108 are subscribers of a service provider operating the first communication network 102. Hence, the first communication network 102 serves as a home communication network for both the first wireless communication device 106 and the second wireless communication device 108.

The first communication network 102 and the first base station 114 can provide a varied range of services to the wireless communication devices within range. A base station and a communication network can provide services such as voice-based services, internet services, short messaging services, multimedia messaging services, push-to-talk services, broadcast services, and wireless LAN services.

Similarly, the second communication network 104 includes a third wireless communication device 110, a fourth wireless communication device 112, and a second base station 116. The second communication network 104 serves as the home communication network for the third wireless communication device 110 and the fourth wireless communication device 112.

Hereinafter the invention is described with reference to the first wireless communication device 106 for the sake of clarity. The first wireless communication device 106 subscribes to one or more services provided by its service provider. The first wireless communication device 106, at a first geographic location within range of the first base station 114, sends a service request to the first base station 114, which is within its home communication network 102. The first base station 114 receives the request and, depending upon the subscription details of the first wireless communication device 106, the first base station 114 grants or denies access to the requested service.

The first wireless communication device 106 can change its location to be outside the range of the first communication network 102. The first wireless communication device 106 is said to be in a 'roaming mode' when another communication network provides services to it. For example, the first wireless communication device 106 may leave the coverage area of the first communication network 102 and enter in the coverage area of the second communication network 104. Depending on service level agreements between a first service provider operating the first communication network 102 and a second service provider operating the second communication network 104, the first wireless communication device 106 may be able to access a limited number of services available from the second communication network 104.

For example, the first wireless communication device 106 may subscribe to voice-based services and wireless internet services from its home communication network 102. The device 106 may move out of the coverage area of the first communication network 102 and into the coverage area of the second communication network 104. The first service provider and the second service provider may have a service level agreement to provide each other's users with voice-based services only. Based on this agreement, the second communication network 104 provides the user with voice-based services but denies the device 106 access to wireless internet services.

If the second communication network 104 denies the device 106 access to some of the services to which it subscribes (from a home service provider), the device 106 can try to access services from other communication networks providing services in the region. In case none of the available communication networks provide the device 106 with access to all its subscribed services, the device 106 starts accessing service from one of the available communication networks based on predefined criteria.

Figure 2:
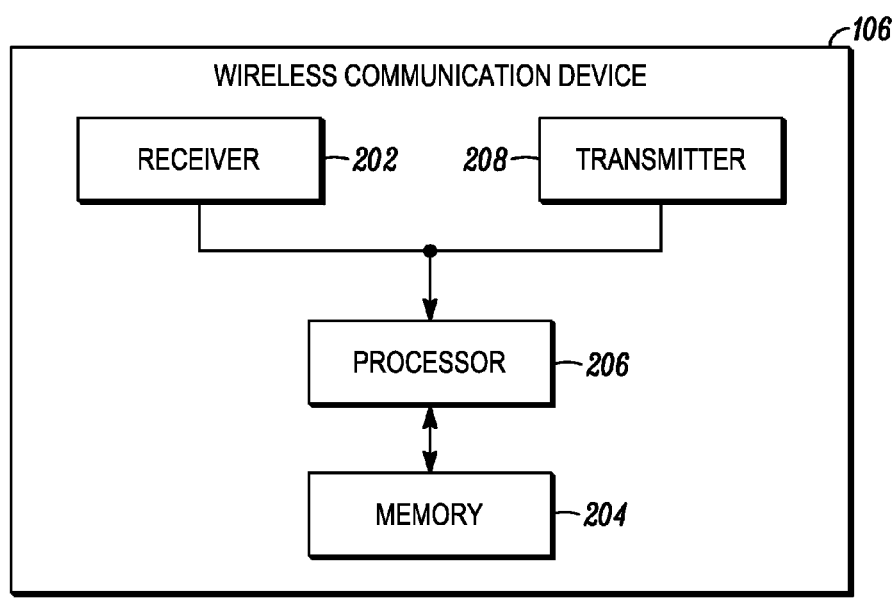
FIG. 2 illustrates a block diagram of a wireless communication device, in accordance with various embodiments of the present invention.

FIG. 2 illustrates a block diagram of the wireless communication device 106, in accordance with various embodiments of the present invention. The wireless communication device 106 includes a receiver 202, a memory 204, and a processor 206. When the wireless communication device 106 moves out of the coverage area of the first communication network 102 and into the coverage area of the second communication network 104, its receiver 202 receives identification parameters from the second communication network 104. In an embodiment, the identification parameters include a System Identification (SID) number and a Network Identification (NID) number.

The processor 206 is configured to compare the identification parameters with entries in a preferred roaming list (PRL) present in the memory 204 of the wireless communication device 106. The PRL includes a prioritized list of communication networks on which the wireless communication device 106 would prefer to camp. Further, the processor 206 determines service information from the PRL when the identification parameters match at least one entry in the PRL. The service information identifies which service or services are provided by the second communication network 104. The processor 206 is further configured to compare the service information with a service-related datum present at the memory 204, which indicates one or more services that the wireless communication device 106 is attempting to access from the second communication network 104. Moreover, the processor 206 can select the second communication network 104 if the service information matches the service-related datum.

For an embodiment of the present invention, the wireless communication device 106 also includes a transmitter 208 to send a request to a base station 116 to access at least one service from the second communication network 104. Access to the requested service or services is then granted or denied by the base station 116 depending on service level agreements.

Figure 3:
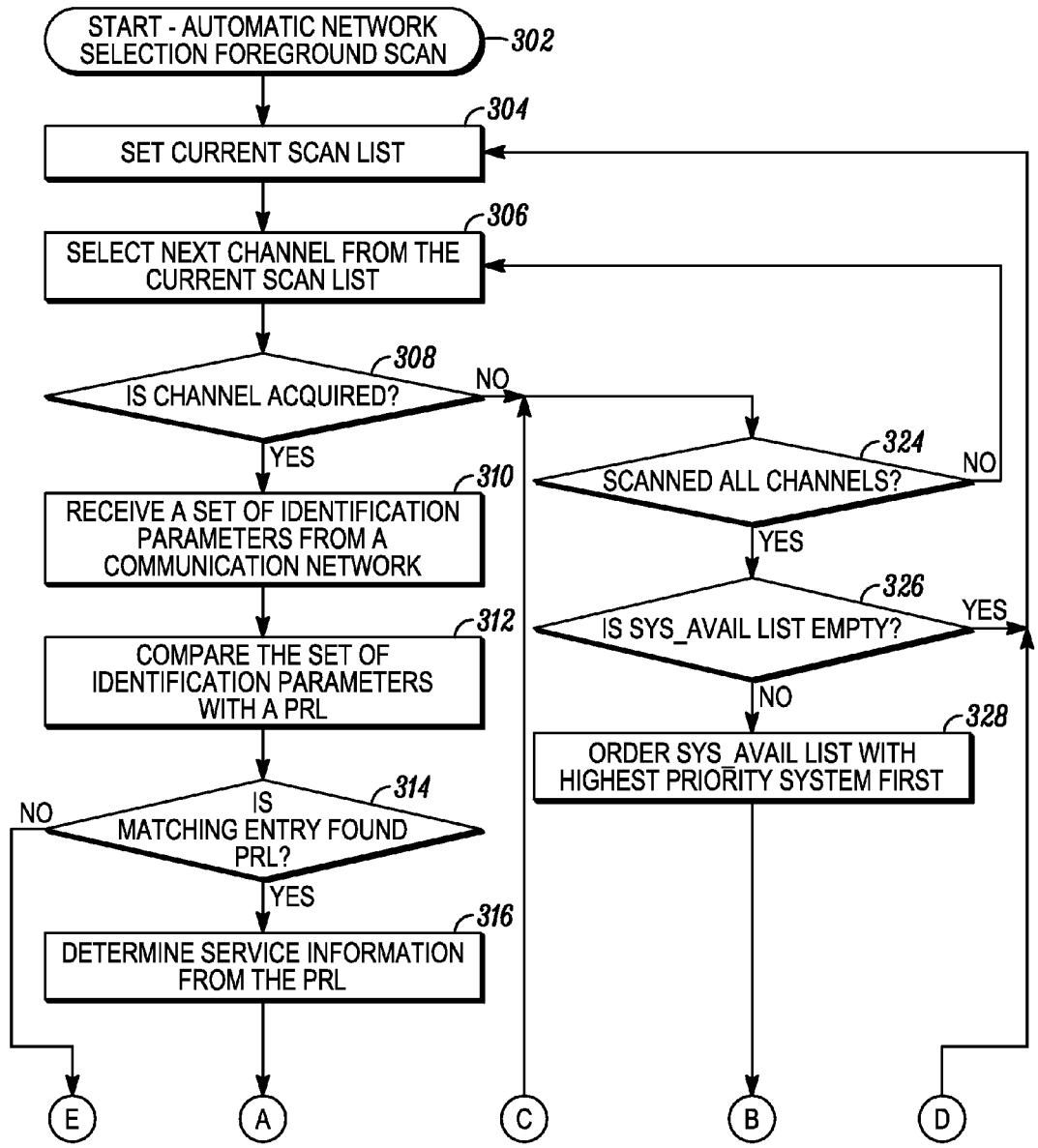
FIGS. 3 and 4 illustrate a flow-diagram depicting an automatic network selection mode of operation of a wireless communication device, in accordance with an embodiment of the present invention.
Figure 4:
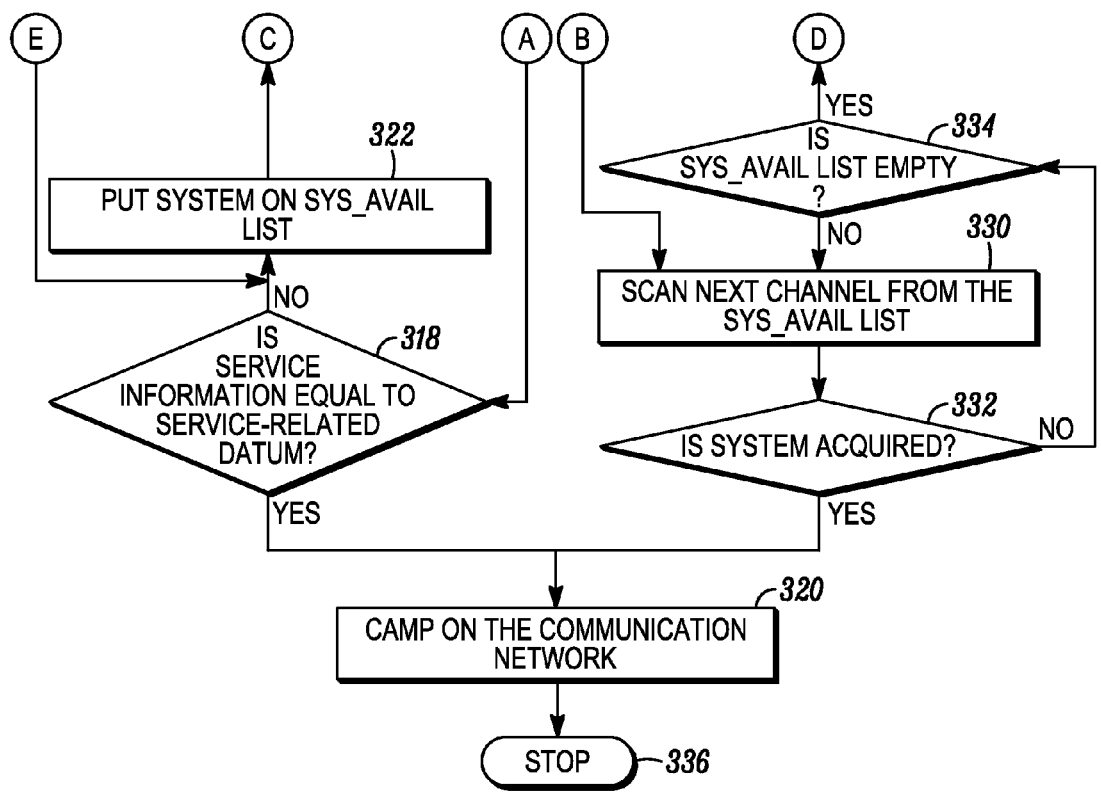

FIGS. 3 and 4 illustrate a flow-diagram depicting an automatic network selection mode of operation of a wireless communication device, in accordance with an embodiment of the present invention. In the automatic network selection mode, the wireless communication device 106 will search for a highest priority communication network referenced in its Preferred Roaming List (PRL). The device 106 then camps on the highest priority communication network available. The priority first goes to communication networks with available services most closely matching services that the wireless communication device 106 seeks. If none of the communication networks provide the sought for services, the device 106 camps on any available network listed on the PRL.

The method initiates at step 302 where automatic network selection mode foreground scanning is initiated to obtain a list of communication networks available at a present location of the wireless communication device 106. At step 304, a current scan list is set; the current scan list includes a list of control frequencies or channels for the communication networks identified at the present location of the wireless communication device 106. During the first pass through step 306, the device 106 selects a channel from the current scan list. At step 308, the device 106 determines the availability of a communication network associated with the channel by checking whether it is acquired.

At step 310, the device 106 finds a communication network over the air and receives an identification parameter that identifies the communication network. For an embodiment, the identification parameter may include SID and NID. It will be obvious to those skilled in the art that another suitable identification parameter could be used in place of SID and NID. At step 312, the device 106 compares the identification parameter with its PRL. At step 314, the device 106 checks whether a matching entry for the identification parameter is found in the PRL. At step 316, the device 106 determines service information from the PRL when a matching entry for the identification parameter is found in the PRL. A SRV_INFO_TYPE field in the PRL contains service information, which identifies service(s) provided by the communication network. The PRL is further explained in conjunction with FIG. 8.

The services provided by a communication network to a roaming device can be different from the services provided to wireless communication devices having the communication network as a home system.

At step 318, the wireless communication device 106 compares the service information with a service-related datum present at the device 106. The service-related datum indicates the service(s) the device 106 seeks from a non-home communication network, which are generally the services to which it subscribes at a home network. In this implementation, the wireless communication device 106 compares service-related datum in a SERVICES_ACTIVE field in a memory of the device 106 with the SRV_INFO_TYPE field of the PRL entry for the acquired communication network. The SERVICES_ACTIVE field can be set by the devices' service provider and stored in, for example, the NAM assigned to the wireless communication device 106. At step 320, the device 106 camps on the communication network if the SERVICES_ACTIVE field contents match exactly with the SRV_INFO_TYPE field contents. After the wireless communication device 106 camps on the communication network, the method terminates at step 336.

If the SERVICES_ACTIVE field contents do not match with the SRV_INFO_TYPE field contents, then at step 322, the identification parameters of the communication network are stored in a SYS_AVAIL list. Also, if no matching entry for the identification parameter is found in the PRL at step 314, the identification parameters of the communication network are stored in the SYS_AVAIL list at step 322. The SYS_AVAIL list is a list of communication networks that the device 106 discovers but do not provide all the services listed in the SERVICES_ACTIVE field.

Further after step 322, or if it is determined at step 308 that the first communication network is not acquired, then at step 324 the device 106 checks whether all the channels from the current scan list have been checked for availability. If channels remain to be scanned, the flow returns to step 306. If all the channels have been checked for availability, then at step 326 the device 106 checks whether the SYS_AVAIL list from step 322 is empty.

If the SYS_AVAIL list is empty, the wireless communication device 106 will return to step 304 and set a new scan list. If the SYS_AVAIL list is not empty, step 328 prioritizes the communication networks in the SYS_AVAIL list with a highest priority network at the top. In an alternative embodiment, when new systems are added in the SYS_AVAIL list they are added in priority order. At step 330, the device 106 scans the system having the highest priority in the SYS_AVAIL list. If the highest priority network is acquired according to step 332, at step 320 the wireless communication device 106 camps on the highest priority network. After the device 106 camps on the highest priority network, the method terminates at step 336.

If step 332 determines that the highest priority network is not acquired, then step 334 checks whether the SYS_AVAIL list has other systems. Step 330 selects a next channel of a next highest priority communication network from the SYS_AVAIL list if the SYS_AVAIL list is not empty. If step 334 determines that the SYS_AVAIL list is empty, the device 106 returns to step 304 to set a new list of channels to be scanned.

For an embodiment of the present invention, the PRL includes channel frequency, system identification parameter, priority, and service information type for known communication networks. The PRL discussed herein, in accordance with an embodiment, is a variant of PRLs proposed in Telecommunication Industry Association/Electronics Industries Association standard 683 (TIA/EIA IS-683 standard) for providing automatic/manual selection of communication networks for a wireless communication device. In an embodiment, the PRL at the device 106 includes a list of preferred communication networks and their corresponding SID, channel frequency, and priority indicator. The structure of the PRL illustrated in the Section 3.5.5.3.2 of the IS-683-C standard and augmented in accordance with an embodiment is explained in detail in conjunction with FIG. 8.

In an alternate embodiment, the device 106 may camp on a first-found communication network even when the service information does not match the service-related datum. The device 106 can continue to scan for other available networks in background scanning. If the device 106 receives a second identification parameter from a second communication network, the device 106 compares the second identification parameter with the PRL in its memory. If the second identification parameter matches one of the entries in the list, the device 106 determines second service information from the PRL that indicates services that the second communication network is capable of providing. The device 106 then compares the second service information with the service-related datum, and the second communication network is put on the SYS_AVAIL list if the second service information matches the service-related datum in whole or in part. For an embodiment, the second communication network is prioritized based on the degree of overlap between the second service information and the service-related datum. At the completion of background scanning, if the second communication network has the highest priority in the SYS_AVAIL list, the device 106 camps on the second communication network.

Figure 5:
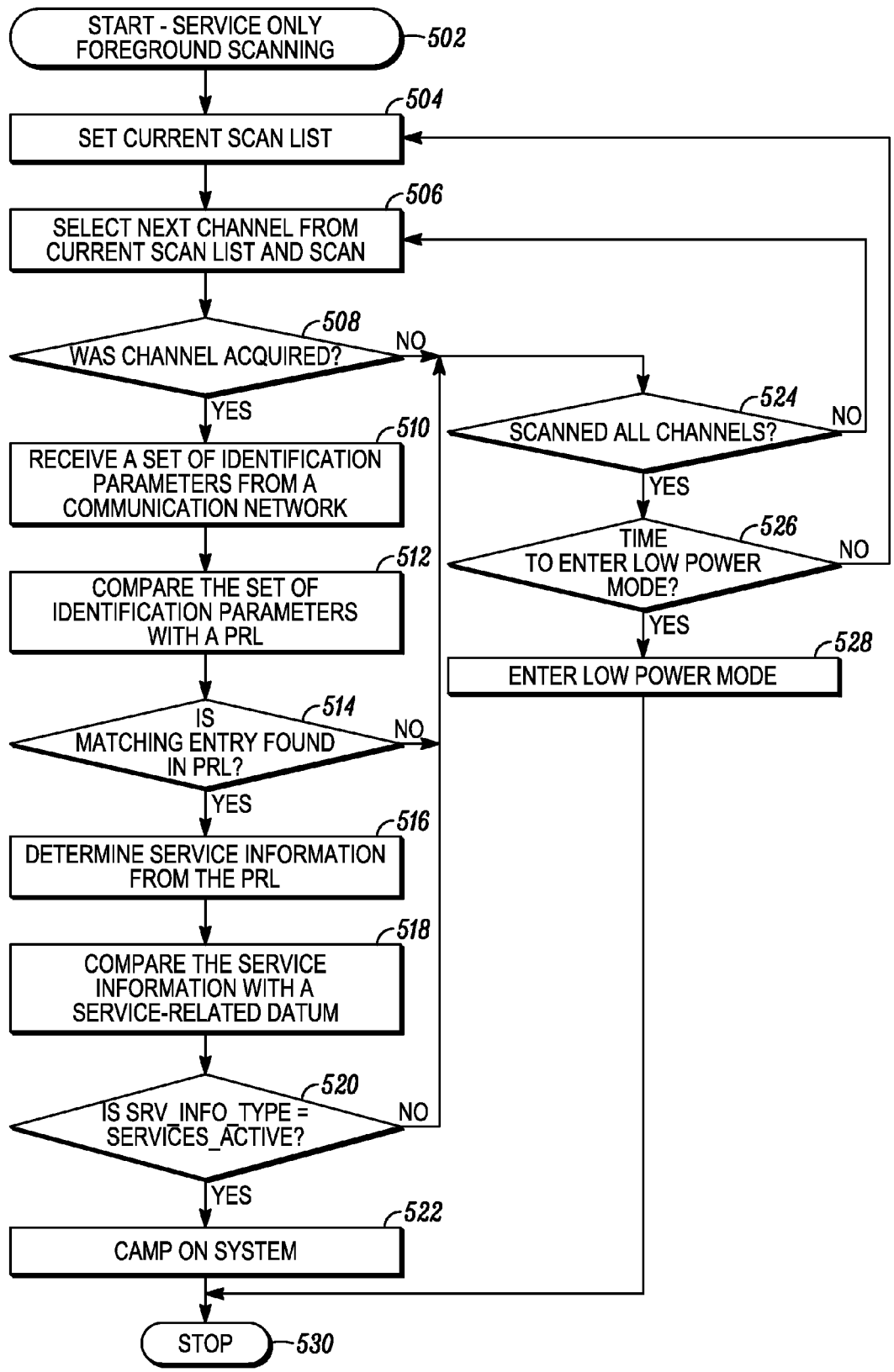
FIG. 5 illustrates a flow-diagram depicting a service-only network selection mode of operation of a wireless communication device, in accordance with an embodiment of the present invention.

FIG. 5 illustrates a flow-diagram depicting a service-only network selection mode of operation of a wireless communication device, in accordance with an embodiment of the present invention. In service-only network selection mode, the wireless communication device 106 will camp only on systems listed in the PRL as 'desired', e.g., home system or preferred roaming systems, plus having services matching the SERVICES_ACTIVE field on the device 106. The service-only network selection mode is particularly useful for data-only communication devices because these devices camp only on systems that provide a specific data service.

The method initiates at step 502 with service-only network selection mode foreground scanning by the wireless communication device 106. At step 504, the device 106 sets a current scan list that includes the list of channels for communication networks available at its current location. At step 506, a channel is selected from the current scan list and scanned. At step 508, the device 106 determines the availability of a communication network associated with the selected channel by checking whether it is acquired. If the device 106 determines that the channel is acquired at step 508, then at step 510, it obtains identification parameters (e.g., SID and NID) for the communication network.

At step 512, the wireless communication device 106 compares the SID and NID with entries in the PRL. At step 514, the device 106 determines whether the identification parameter matches with any entry in the PRL. If the identification parameters match at least one entry in the PRL, then at step 516, the PRL provides service information corresponding to the communication network from a SRV_INFO_TYPE field as described in conjunction with FIG. 8. At step 518, the device 106 compares the SRV_INFO_TYPE field contents with SERVICES_ACTIVE field contents stored in its memory. The SERVICES_ACTIVE field indicates the services sought by the wireless communication device 106. The SERVICES_ACTIVE field can be stored in the NAM assigned to the device 106. At step 520, the device 106 determines whether the SERVICES_ACTIVE field contents match with the SRV_INFO_TYPE field contents. If the SERVICES_ACTIVE field contents match the SRV_INFO TYPE field contents, at step 522, the device 106 camps on the communication network. If the wireless communication device 106 camps on the communication network, the method terminates at step 530.

When the first attempt to acquire a communication network at step 508 is unsuccessful, the device 106 checks whether all the communication networks in the current scan list have been scanned for availability at step 524. Similarly, if no match for the communication network scanned in the first pass is found in the PRL at step 514, the method goes to step 524. Also, if the SERVICES_ACTIVE field content does not match with the SRV_INFO_TYPE field content at step 520, the wireless communication device 106 goes to step 524. If all the communication networks have not been scanned for availability, the wireless communication device 106 selects a next channel from the current scan list in step 506 and proceeds with the steps as described previously.

On the other hand, if all the channels on the current scan list have been scanned for availability, then at step 526 the wireless communication device 106 checks whether it is time to enter a low-power mode of operation by comparing the time taken to check all the channels in the current scan list with a first predetermined time period. If the time taken to check all the channels in the current scan list is greater than the first predetermined time period, then the wireless communication device 106 enters the low power mode of operation at step 528. If the time taken to check all the channels in the current scan list is less than the first predetermined time period, the wireless communication device 106 returns to step 504 and sets a new scan list.

When the wireless communication device 106 is in a low power mode of operation at step 528, the wireless communication device 106 stops scanning for communication networks for a second predetermined time interval. At the same time, the wireless communication device 106 communicates to the user that no services are currently available using a displayed message, an icon, or other means. After the second predetermined time interval has elapsed, the wireless communication device 106 switches back to service-only foreground scanning mode at step 502 and starts scanning again for available channels, at step 504.

Those skilled in the art will appreciate that a wireless communication device in either automatic network selection mode or service-only network selection mode may attempt to access multiple services, and may only be permitted to access a sub-set of desired services utilizing the available communication networks. In these situations, the device can choose the network that offers the highest priority service or the network that offers the largest number of services.

Figure 6:
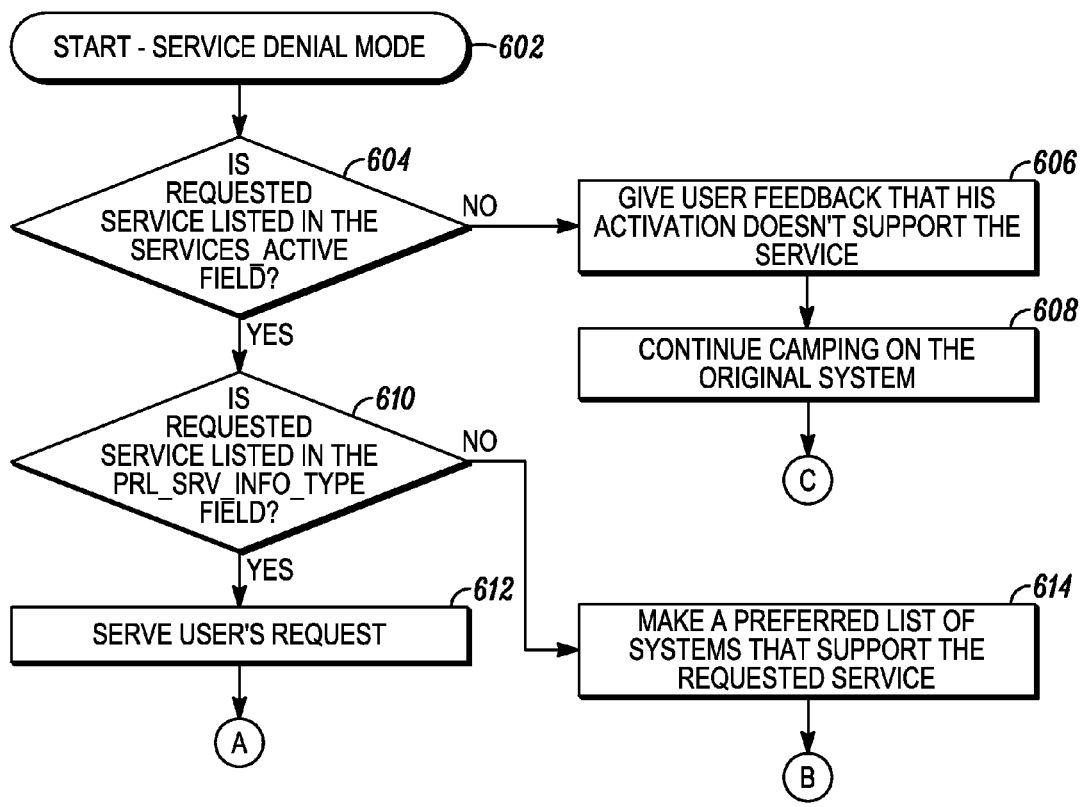
FIGS. 6 and 7 illustrate a flow-diagram depicting a service denial network selection mode of operation of a wireless communication device, in accordance with another embodiment of the present invention.
Figure 7:
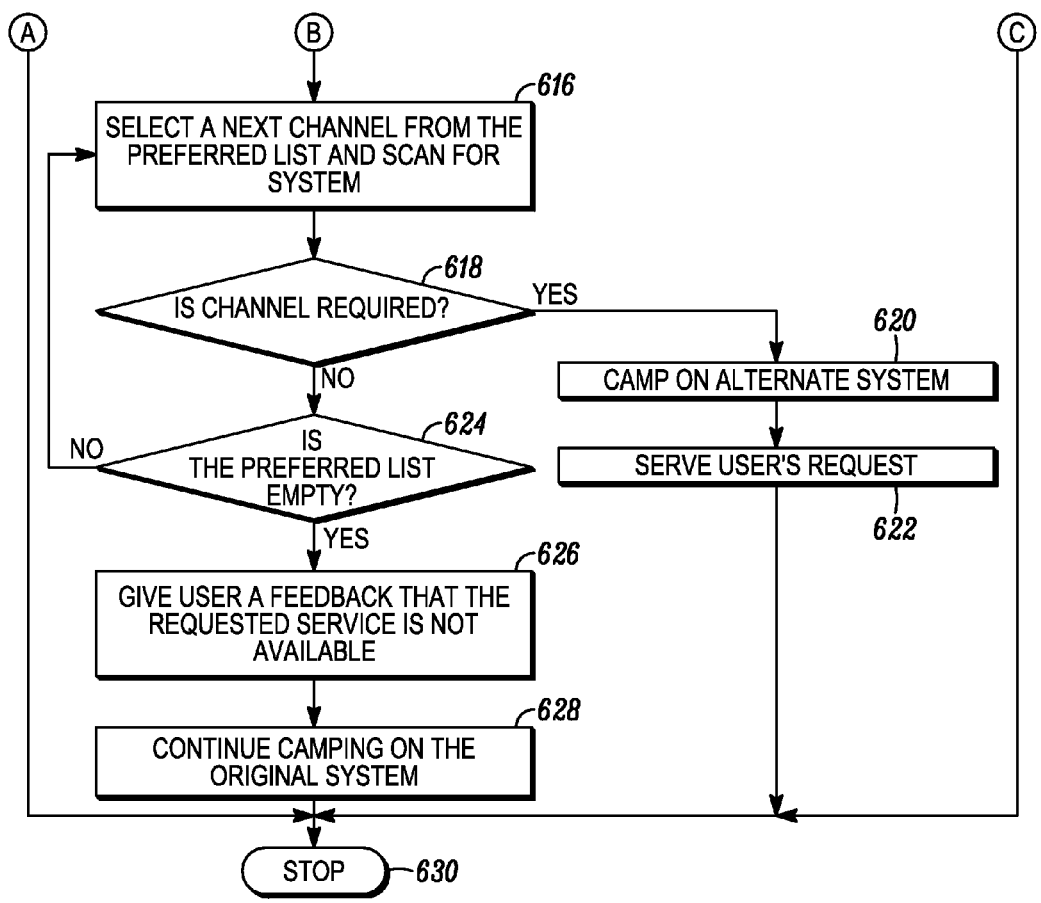

FIGS. 6 and 7 illustrate a flow-diagram depicting a service denial network selection mode of operation of a wireless communication device 106, in accordance with an embodiment of the present invention. A service denial network selection mode can occur when a device is camped on a system. A particular instance of a service requested from the wireless communication device 106 by a user may be denied or allowed depending on the services subscribed from the home system operator, the capabilities of the current system, any roaming agreements between the home system operator and the current service provider, and the availability of an alternate system for the wireless communication device 106.

The method initiates at step 602 when the wireless communication device 106 user makes a request to access a service. At step 604, the device 106 checks whether the requested service is listed in the SERVICES_ACTIVE field of its NAM or other memory. If the requested service is not listed in the SERVICES_ACTIVE field, then at step 606, the wireless communication device 106 provides feedback to the user by displaying a message on its screen that the current activation of the device 106 does not support the requested service. At step 608, the wireless communication device 106 continues camping on the original communication network to access any other services provided by the original communication network. The method terminates at step 630.

If the requested service is listed in the SERVICES_ACTIVE field, then at step 610, the device 106 checks the SRV_INFO_TYPE field in the PRL as depicted in FIG. 8 to see if the current communication network provides the requested service. If the service is listed in the SRV_

INFO_TYPE field, then the communication network provides the wireless communication device 106 with access to the requested service at step 612. On receiving access to the requested service, the method terminates at step 630. If the service is not listed in the SRV_INFO_TYPE field, at step 614, a preferred list of communication networks that support the requested service is prepared.

At step 616, a channel from the preferred list of systems is selected and scanned for availability. At step 618, the wireless communication device 106 checks whether an alternate communication network associated with the channel is acquired. At step 620, the device 106 camps on the alternate communication network if it is acquired. Further, at step 622, the alternate communication network provides the device 106 access to the requested service. If the alternate communication network is not acquired, then at step 624, the device 106 checks whether the preferred list of communication networks is empty. If the preferred list is not empty, the device 106 returns to step 616 and selects a next channel from the preferred list and scans for availability. If the preferred list is empty, then at step 626, the wireless communication device 106 provides feedback to the user through, for example, a message on the screen that the requested service is not accessible through any of the communication networks currently available. At step 628, the wireless communication device 106 continues camping on the original communication network to access any other services available from the communication network. The method terminates at step 630.

FIG. 8 illustrates an extended Preferred Roaming List (PRL) system table entry 800, in accordance with various embodiments of the present invention. The extended system table 800 includes, apart from the fields 810, 812, 814, 816, 818, 820, 822, 824, 826, 828, 830, and 832 present in the system table as per the IS-683-C standard, a TYPE_SPECIFIC_SERVICE_INFO field 834. The table 800 defines each system record in column 803 and its length in column 806. According to the IS-683-C standard, the system table includes a SYS_RECORD_LENGTH field 810 that signifies the length of the system table entry. SYS_RECORD_TYPE field 812 specifies the format of the rest of the fields in the table entry. The PREF_NEG field 814 stands for Preferred/Negative System. The field 814 is set to '1' for a communication network if a wireless communication device 106 is allowed to camp on it. The field 814 is set to '0' for a communication network if the wireless communication device 106 is not allowed to camp on it.

The GEO field 816 specifies the geographical region of the communication network. If the communication network is the first entry in the system table, the GEO field 816 is set to '0'. The GEO field 816 is set to '1' if the communication network associated with the entry is in a geographical region that is same as the communication network associated with the previous entry in the system table. On the other hand, if the communication network associated with the current entry is in a different geographical region from the previously listed communication network, the GEO field 816 is set to '0'.

A PRI field 818 indicates the relative priority of the communication network. If the communication network is the last entry in the geographical region, or if the PREF_NEG field 814 is set to '0', the PRI field 818 is set to '0' and has no meaning. If the communication network associated with the entry is more desirable than a communication network associated with a next entry in the system table, the PRI field 818 is set to '1'. If the communication network associated with the entry is as desirable as the communication network associated with the next entry in the system field, the PRI field 818 is set to '0'.

Further, the system table as described in the IS-683-C standard includes an ACQ_INDEX field 820 that indicates an acquisition record index. The field 820 is set to the index of the acquisition record that specifies the acquisition parameter of the communication network associated with the entry. The index of the $n^{th}$ acquisition record is n−1. The next field 822 in the system table entry is Type-specific system ID record. The value in the field 822 depends on the value of the SYS_RECORD_TYPE field 812. The type-specific system ID record field 822 is followed by a ROAM_IND field 824 that indicates a roaming indication value of the communication network. If the PREF_NEG field 814 is set to '1', the ROAM_IND field 824 is set to the roaming indication value of the communication network. If the PREF_NEG field 814 is set to '0', the ROAM_IND field 824 is omitted from the entry.

The next field 826 in the system table is ASSOCIATION_INC that represents an association tag included flag. The ASSOCIATION_INC field 826 is set to '1' if the next three fields are included. If the next three fields are not included the ASSOCIATION_INC field 826 is set to '0'. If included, the ASSOCIATION_TAG field 828 is set to an 8-bit number that specifies the set to which the communication network belongs. The value of the 8-bit number is unique within a GEO. A PN_ASSOCIATION field 830, which is specified after the ASSOCIATION_TAG field 828 in the system table entry according to the IS-683-C standard, is set to '1' if the communication network associated with the entry has the same PN assignment as other communication networks in the same GEO that are members of the set identified by the ASSOCIATION_TAG field 828 and whose PN_ASSOCIATION field 830 is also set to '1'.

The DATA_ASSOCIATION field 832 is set to '1' if the communication network associated with the entry can reach the same Packet Service Data Nodes (PDSNs) as other communication networks in the same GEO that are members of the set identified by the ASSOCIATION_TAG field 828 and whose DATA_ASSOCIATION field 832 is also set to '1'.

The extended PRL system table 800 utilizes at least a part of the RESERVED field from the PRL system table as specified in the IS-683-C standard to include type-specific service information for the communication network associated with the entry. The type-specific service information field 834 represents the number of services provided by the communication network. For each service provided, a Detail_Service_Info block would be included in the PRL. The Detail_Service_Info block includes fields that describe major services provided by the communication network and is explained in detail in conjunction with FIG. 9.

FIG. 9 illustrates a service information table 900, in accordance with various embodiments of the present invention. The fields in the service information table 900 provide detailed information regarding the services provided by the communication network associated with the table entry in a particular GEO. Column 903 defines the DETAIL_SERVICE_INFO fields and column 906 defines the field lengths. A SRV_INFO_LENGTH field 910 represents the length of service information in octets. Further, the service information table 900 includes a SRV_INFO_TYPE field 912, which is set to indicate the major types of services supported by the network. The bits are set so that the services can be uniquely identified within the field. A table depicting coded representations of major types of services provided by a referenced communication network is explained in detail in conjunction with FIG. 10. The SRV_INFO_TYPE field 912 is an 8-bit long field in this implementation. A SRV_INFO_SUBTYPE field 914, a 4-bit long field in this implementation, is set to indicate subtypes of the major services depicted in the SRV_INFO_TYPE field 912. Further, the TYPE_SPECIFIC_SERVICE_INFO field 916 is a variable length field which provides more detailed information of the services represented by the SRV_INFO_TYPE field 912.

FIG. 10 illustrates a table 1000 depicting coded representations of major types of services provided by a referenced communication network. The communication network may provide a variety of services to registered wireless communication devices, and the table 1000 assists in tracking these services. All the services available from the communication network may not be provided to the wireless communication devices that are registered as roaming devices in the communication network. The major types of services are represented using the SRV_INFO_TYPE field 912 of the detailed service information table 900 as shown in FIG. 9.

Column 1003 represents the available bit decoding for various services that may be provided by the referenced communication network, and column 1006 provides a parameter description of the bit decoding. In this implementation, an eight-bit string 1010 '00000000' represents that a communication network provides 'all services'. Bit-string 1012 '00000001' represents 'voice services' that the communication network associated with the entry in the system table allows a device 106 to access. Bit-string 1014 '00000010' represents that 'data services' are available. The SRV_INFO_SUBTYPE field 914 as depicted in FIG. 9 provides a detailed description of various data service sub-types allowed by the referenced communication network. FIG. 11 provides a detailed description of codes used to represent various data services.

Returning to FIG. 10, bit-string 1016 '00000100' indicates push-to-talk (PTT) services. A detailed description of the types of PTT services can be provided in field 914 of FIG. 9, if necessary. If the communication network provides wireless local area network (WLAN) services to the wireless communication network, a bit-string 1018 '00001000' in the SRV_INFO_TYPE field 912 in FIG. 9 represents 'WLAN services'. Specific types of WLAN information are explained in detail in conjunction with FIG. 12. The reserved bits 1020 may be utilized to define future services.

FIG. 11 illustrates a table 1100 depicting a coded representation of data service subtypes provided by a referenced communication network. To represent details of data services provided by a communication network, the SRV_INFO_TYPE field 912 in an extended PRL entry of that network is set to the bit string 1014 '00000010', and the SRV_INFO_SUBTYPE field 914 is filled in according to table 1100 depicted in FIG. 11.

Column 1103 represents the available bit decoding for various data service subtypes that may be provided by the referenced communication network, and column 1106 describes a parameter associated with the bit decoding specified in the column 1103. A bit-string 1110 '0000' in the SRV_INFO_SUBTYPE field 914 represents that the referenced communication network provides Short Messaging Services (SMS). A bit-string 1112 '0001' represents Multimedia Messaging Services (MMS). A bit string 1114 '0010' in the SRV_INFO_SUBTYPE field 914 represents 'Voice over Internet Protocol (VOIP) services'. A bit-string 1116 '0011' represents '1× packet data' sent by certain communication networks. A bit-string 1118 '0100' represents that the referenced communication network provides 'browser service'. Bit-string 1120 '0101' represents that 'video services' are provided by the communication network. Additional combinations of 4-bit bit-strings can define further data service subtypes.

FIG. 12 illustrates a table 1200 depicting coded representations of WLAN service subtypes provided by a referenced communication network. To represent details of WLAN services provided by the communication network, the SRV_INFO_TYPE field 912 is set to the bit string 1018 '00001000', and the SRV_INFO_SUBTYPE field 914 is filled in according to table 1200 depicted in FIG. 12 to indicate more detailed types of WLAN services supported by the communication network.

Column 1203 represents the available bit decoding for various WLAN service subtypes that may be provided by the referenced communication network, and column 1206 provides a parameter description of the bit decoding. A bit-string 1210 '0000' in the SRV_INFO_SUBTYPE field 914 represents that the referenced communication network provides WLAN services with no hand-off provisioning. A bit-string 1212 '0001' indicates that the communication network provides WLAN services with handoff provisions. Additional 4-bit bit-string combinations can define future WLAN services.

Various embodiments of the present invention increase the capacity of a communication network by reducing access to communication devices that may request services which the communication network will ultimately deny. An embodiment of the present invention informs users that the service they are attempting to access is not available from the current communication network, which leads to a reduction in the attempts to access that service and hence a reduction in misuse of communication network capacity. Further, with the addition of fields to a conventional PRL, certain services can be restricted for wireless communication devices that are roaming or do not have appropriate roaming agreements. The service providers for wireless communication devices thus obtain more flexibility while designing the PRL to enable them to match up the service providers' activation levels with roaming agreements for different services and service types. Moreover, when a wireless communication device is denied access to a particular service by a communication network on the basis of non-subscription or non-availability, the wireless communication device displays a message through its User Interface (UI) stating the exact reason for denial. Such feedback may reduce the number of attempts made by the user to access the particular service while using that network. Further embodiments also provide scanning of communication networks where the wireless communication device camps on an acceptable communication network and keeps scanning in the background for a communication network that provides all the services that can be availed by the wireless communication device. Additionally, changes to service level information can be made over-the-air (OTA) and in real time. For example, the SERVICES_ACTIVE field at a wireless communication device can be updated OTA by a service provider.

It will be appreciated that the method and system for selecting a communication network described herein may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of a method and system for selecting a communication network. Alternatively, some or all the functions could be implemented by a state machine that has no stored program instructions, or in one or more application-specific integrated circuits (ASICs), in which each function, or some combinations of certain of the functions, are implemented as custom logic. Of course, a combination of the two approaches could also be used. Thus, methods and means for these functions have been described herein.

It is expected that one with ordinary skill, notwithstanding possibly significant effort and many design choices motivated by, for example, available time, current technology, and economic considerations, when guided by the concepts and principles disclosed herein, will be readily capable of generating such software instructions, programs, and ICs with minimal experimentation.

It should be observed that the present invention encompasses combinations of a method for selecting a communication network. Accordingly, the method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms "comprises," "comprising," or any other variation thereof, are intended to cover a non-exclusive inclusion, such that a process, method, article, or apparatus that "comprises" a list of elements includes not only those elements but may also include other elements that are not expressly listed or inherent in such a process, method, article, or apparatus. An element proceeded by "comprises . . . a" does not, without more constraints, preclude the existence of additional identical elements in the process, method, article, or apparatus that "comprises" the element. The term "another," as used in this document, is defined as at least a second or more. The terms "includes" and/or "having", as used herein, are defined as "comprising".

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. A method for selecting a communication network by a wireless communication device, the method comprising:
    scanning a channel corresponding to a communication network;
    receiving an identification parameter at the wireless communication device from the communication network, wherein the identification parameter identifies the communication network;
    comparing the identification parameter with a list at the wireless communication device, wherein the list is an augmented preferred roaming list (PRL) comprising: a channel frequency, a system identification parameter, a priority of the communication network, at least one service information type, and at least one service information sub-type associated with the service information type, wherein the at least one service information type indicates at least one major type of service provided by the communication network and the at least one service information sub-type indicates at least one particular service provided by the communication network;
    determining, from the list and the identification parameter, a service information type and a service information sub-type associated with the service information;
    comparing the service information type and the service information sub-type with a service-related datum stored at the wireless communication device in a Number Assignment Module (NAM) of the wireless communication device, wherein the service-related datum indicates a service that the wireless communication device is attempting to access; and
    selecting the communication network for accessing a service associated with the service information type if the service information sub-type matches the service-related datum.

2. The method as recited in claim 1 further comprising:
    adding the channel to an alternate list if the service information sub-type does not match the service-related datum.

3. The method as recited in claim 2 further comprising:
    prioritizing the channel in the alternate list based on a comparison of the service information sub-type with the service-related datum.

4. The method as recited in claim 3 further comprising:
    selecting the channel from the alternate list if the channel has a highest priority in the alternate list.

5. The method as recited in claim 1 further comprising:
    switching the wireless communication device to a low power mode when a time period for selecting a communication network exceeds a first predetermined time period.

6. The method as recited in claim 5 further comprising:
    switching the wireless communication device to a normal power mode from the low power mode after a second predetermined time period has elapsed.

7. The method as recited in claim 1, wherein the identification parameter comprises: a System Identification (SID) number and a Network Identification (NID) number.

8. The method as recited in claim 1, wherein the list comprises:
    a preferred roaming list (PRL) stored at the wireless communication device.

9. The method as recited in claim 8, wherein the service information type is obtained from contents of a SRV_INFO_TYPE field of the PRL.

10. The method as recited in claim 8, wherein the service information sub-type is obtained from contents of a SRV_INFO_SUBTYPE field of the PRL.

11. The method as recited in claim 1, wherein the service-related datum is listed in a SERVICES_ACTIVE field in the wireless communication device.

12. The method as recited in claim 11, wherein the SERVICES_ACTIVE field is present in a Number Assignment (NAM) module at the wireless communication device.

13. The method as recited in claim 1, further comprising:
    receiving a request for a requested service;
    comparing the requested service with a SERVICES_ACTIVE field stored at the wireless communication device; and
    notifying a user that current device activation does not support the requested service, if the requested service is not listed in the SERVICES_ACTIVE field.

14. The method as recited in claim 13 further comprising:
comparing the requested service with a SRV_INFO_SUBTYPE field in a PRL entry corresponding to a current communication network;
preparing a preferred list of channels that are associated with communication networks that will support the requested service, if the service is not listed in the SRV_INFO_SUBTYPE field;
scanning a first channel from the preferred list; and
camping on an alternate communication network associated with the first channel; if the first channel is acquired.

15. The method as recited in claim 14 further comprising:
scanning further channels from the preferred list; if the first channel is not acquired; and
indicating that the requested service is not available from any communication networks, if no channels from the preferred list are acquired.

16. A wireless communication device comprising:
a receiver capable of receiving a set of identification parameters from a communication network, wherein the set of identification parameters identify the communication network; and
a processor configured to:
compare the set of identification parameters with a list stored at the wireless communication device, wherein the list is an augmented preferred roaming list (PRL) comprising: a channel frequency, a system identification parameter, a priority of the communication network, at least one service information type, and at least one service information sub-type associated with the service information type, wherein the at least one service information type indicates at least one major type of service provided by the communication network and the at least one service information sub-type indicates at least one particular service provided by the communication network;
determine a service information type and a service information sub-type, associated with the service information type, from the list when the set of identification parameters matches at least one entry in the list;
compare the service information type and the service information sub-type with a service-related datum stored at the wireless communication device in a Number Assignment Module (NAM) of the wireless communication device, wherein the service-related datum indicates at least one specific service the wireless communication device seeks to access; and
select the communication network for accessing a service associated with the service information type if the service information sub-type matches the service-related datum.

17. The wireless communication device as recited in claim 16 further comprising:
a transmitter for sending a request to access a service from the communication network.

18. The wireless communication device as recited in claim 16 further comprising:
a memory for storing the service-related datum.

* * * * *